Jan. 19, 1971  C. W. WESTON, JR  3,555,834
DEEP SUBMERSIBLE POWER UNIT
Filed May 6, 1969  2 Sheets-Sheet 1

INVENTOR
CLEMENT WALKER WESTON, JR.

BY
ATTORNEY

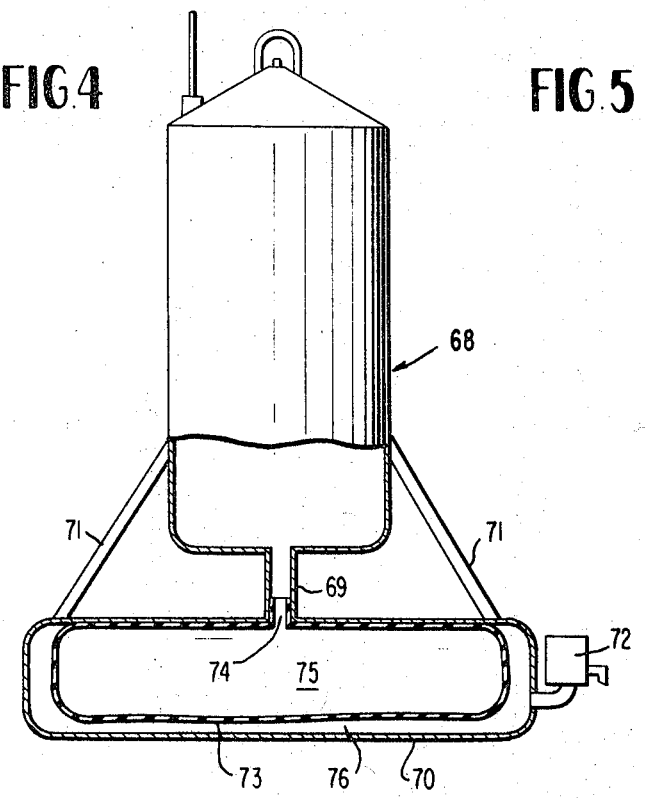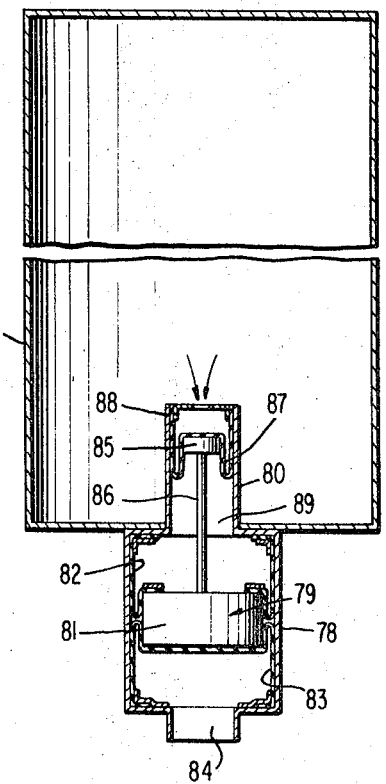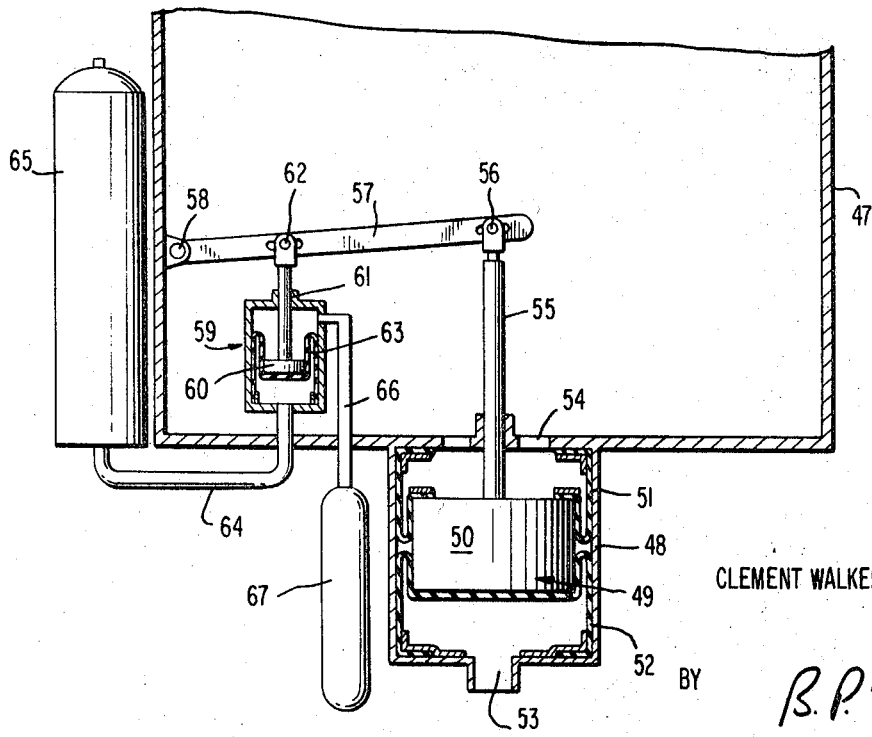

United States Patent Office 3,555,834
Patented Jan. 19, 1971

3,555,834
DEEP SUBMERSIBLE POWER UNIT
Clement Walker Weston, Jr., Box 53252,
New Orleans, La. 70150
Filed May 6, 1969, Ser. No. 822,225
Int. Cl. B63c *11/00*
U.S. Cl. 61—69                                    11 Claims

ABSTRACT OF THE DISCLOSURE

A power unit for drilling or for operating a manipulator or like means at substantially unlimited depths in the ocean. The unit is filled with a fluid and has means exposed to ambient sea pressure to maintain at all times a positive pressure differential inside of the unit to thereby assure the exclusion of sea water from the unit.

BACKGROUND OF THE INVENTION

With the ever increasing exploration of the ocean depths and the utilization of natural resources found only on the ocean bottom, there is an accelerated demand for practical and reliable mechanisms to drill, manipulate and to perform various operations at great ocean depths. Such devices of course require reliable and practical power operating units and in general the prior art has not yet developed the necessary means to meet the great demands in this rapidly growing vital area.

The present invention is concerned with the provision of a basic submersible power unit for operating any of a variety of instrumentalities which may need to be employed at great depths in the ocean. The invention is not concerned with the details of these instrumentalities per se and is not concerned with the details of the power components per se which may vary considerably. However, the invention will be disclosed in terms of a simplified fluid pressure operated or hydraulic power unit contained within a fluid filled casing equipped with efficient and simplified means to maintain a small but positive pressure differential inside of the unit casing at all times in comparison to the outside ambient sea pressure, thus rendering it virtually impossible for sea water to enter the unit. The maintenance of the positive pressure differential within the unit renders it to a great extent unnecessary to rely upon costly high pressure seals and the means employed to maintain the positive pressure differential at all depths are relatively simple and economical and therefore reliable and not likely to malfunction. While the positive pressure maintaining means may vary in form, each embodiment of the means is founded on the principle of utilizing a complete separator device between the ambient sea pressure and the fluid which fills the unit casing, together with one means or another operating through the separator to maintain a relatively small but positive pressure inside of the power unit under all conditions.

Various details and advantages and features of the invention will become apparent during the course of the following description.

DESCRIPTION OF DRAWING FIGURES

FIG. 3 is a fragmentary vertical section through a portion of a power unit according to a modification of the invention with the internal power components omitted for simplicity of illustration.

FIG. 4 is a side elevational view, partly in section, through a further modified form of power unit.

FIG. 5 is a fragmentary central vertical section through another modified form of invention power unit.

DETAILED DESCRIPTION OF PREFERRED EMBODIMENTS

Figure 1:
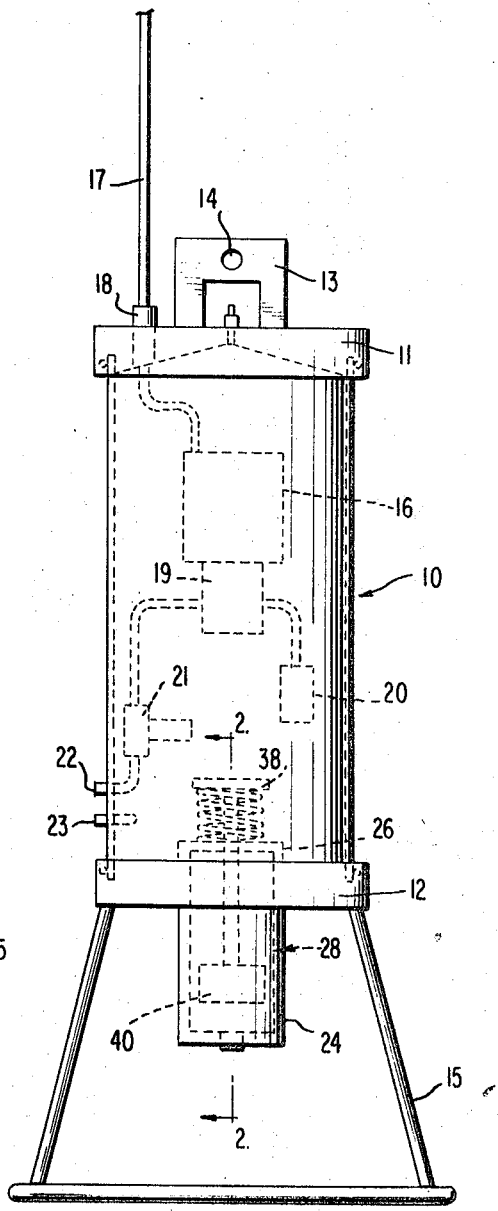
FIG. 1 is a partly diagrammatic side elevational view of a submersible power unit embodying the invention in accordance with one preferred form thereof.
Figure 2:
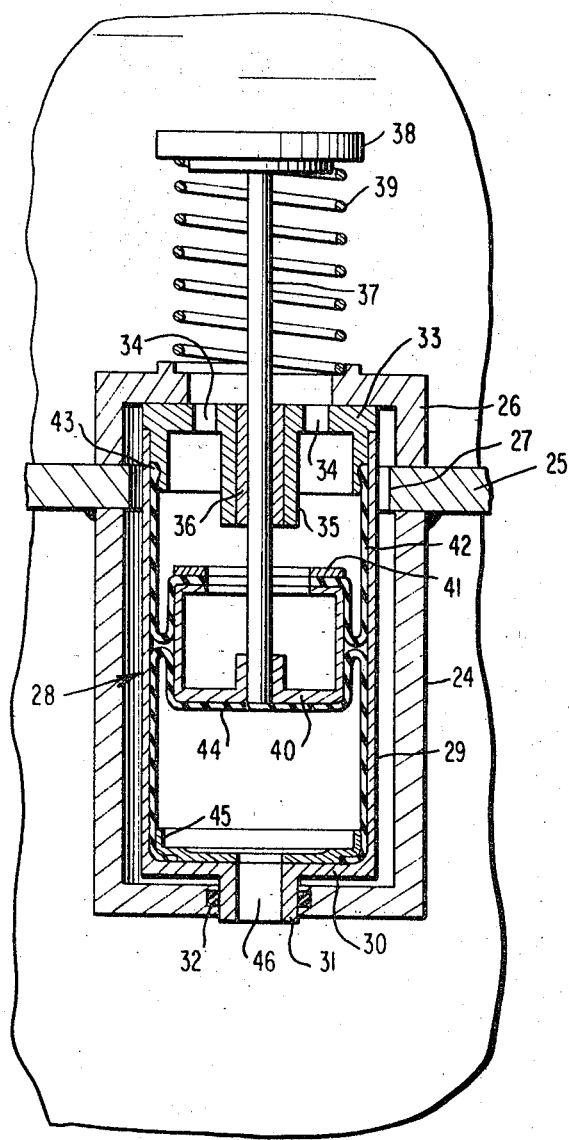
FIG. 2 is an enlarged fragmentary vertical section taken on line 2—2 of FIG. 1.

Referring first to FIGS. 1 and 2 of the drawings, wherein like numerals designate like parts throughout the same, the numeral 10 designates a sturdy cylindrical unit casing having upper and lower closure caps 11 and 12 firmly secured thereto by any conventional means and forming fluid tight joints with the casing 10. Because of the maintenance inside of the casing at all times and at all depths of a relatively mild positive pressure, it is not necessary to provide high pressure resistant seals between the caps 11 and 12 and the casing 10.

The upper cap 11 is equipped with a sturdy lifting bracket 13 having a suitable eye 14 and the lower cap 12 has a sturdy supporting stand 15 rigidly secured thereto, the details of which are unimportant to the invention. While the internal power components of the unit may vary considerably in practice, a simplified system is shown diagrammatically in FIG. 1 including an electric motor 16 having a power cable 17 leading through a hull penetrator fitting 18 in the upper cap 11. The motor 16 operates a hydraulic pump 19 having an intake strainer 20 and a suitable relief valve 21. Fluid pressure outlet and return fittings are indicated at 22 and 23 leading to and from external mechanisms, not shown, which it is desired to operate at great ocean depths. These mechanisms per se form no part of the invention and may be conventional or special mechanisms. It will be understood that the invention power unit may, in actual practice, contain a much more sophisticated system for powering various external mechanisms and the system disclosed in FIG. 1 schematically has been simplified for clarity and because the essence of the invention is not concerned with these power components per se.

The pressure compensating means for maintaining at all times and at all depths a mild but adequate positive pressure inside of the unit casing 10 comprises in FIG. 2 a sturdy cylindrical housing section 24 preferably welded to the main wall 25 of lower cap 12. The housing section 24 is disposed entirely outside of the casing 10 and is therefore exposed to ambient sea pressure. A short internal housing section 26 is suitably secured to the interior side of the wall 25 and resides in the bottom portion of the casing 10. The wall 25 has an opening 27 formed therethrough adjacent the two housing sections 24 and 26 to form a complete chamber for a pressure compensating mechanism and separator unit now to be described, designated in its entirety by the numeral 28.

The compensator unit 28 comprises a cylinder 29 having a bottom wall 30 with a central sleeve extension 31 formed thereon and projecting through a bottom opening of the housing section 24 and sealed within said opening by any conventional seal 32. The opposite end of cylinder 29 receives a closure head 33 snugly having ports 34 which place the interior of the unit 28 in direct communication with the interior of the casing 10. The head 33 has a central hub portion 35 containing a rod bearing 36 with suitable packing means, not shown. This bearing receives axially therethrough a compensating piston rod 37 having an upper head 38 to receive the thrust of a compensating or pressurizing coil spring 39 whose tension may be selected as found desirable to provide the desirable positive pressure differential. The opposite end of this spring bears against the housing section 26.

Below the head 33, the piston rod 37 has secured to it a piston 40 having its top secured by a suitable clamp ring 41 to a first flexible diaphragm 42 whose skirt is tightly clamped between the head 33 and the wall of cylinder 29, as shown at 43. The lower wall of piston 40 is suitably connected with a second flexible diaphragm 44 separate and distinct from the diaphragm 42 and also lying inside of the cylinder 29 and having its skirt securely clamped by a ring element 45 in the bottom of the cylinder 29 to the side wall thereof. As clearly shown in FIG. 2, the diaphragm 44 is in open communication with ambient sea pressure through the bore 46 while the diaphragm 42 and the hollow piston 40 are in open communication through the ports 34 with the interior of casing 10 which is completely filled with the oil or fluid of the type utilized by the pump 19.

It may be seen that the unit 28 including the two diaphragms 42 and 44 forms a complete separator interposed between the outside sea water and the internal fluid filled unit casing 10. In the absence of the spring 39 and with the entire unit filled with a non-compressible liquid, such as oil, a condition of balanced pressure within and outside of the casing 10 would exist at any depth in the ocean. With the spring 39 constantly bearing on the head 38 and therefore adding its force to the pressure of the sea water beneath the piston 40, there will always be maintained a positive pressure differential int he casing 10 thus assuring that sea water cannot possibly enter the same. The degree of positive pressure thus maintained need not be great and may be varied by changing the strength of the spring 39. The unit is extremely simple, sturdy and secure. A complete barrier or separator is provided, as explained, and the device automatically maintains the desired positive pressure in the casing 10 at any depth in the ocean.

FIG. 3 of the drawings depicts a modification of the invention in which positive pressure inside of the power unit is maintained by a gas loading means instead of spring means. The overall principle of operation and the results achieved are the same as disclosed in the prior embodiment, FIGS. 1 and 2. In FIG. 3, the conventional internal power components, including motor, pump, valve, etc. have been omitted for simplicity and because these elements are identical to the arrangement shown in FIG. 1.

In FIG. 3, the oil filled main casing of the power unit is shown at 47 having a lower end housing extension 48 receiving a separator and compensating unit 49, shown diagrammatically, which may be the identical unit 28 shown in fuller detail in FIG. 2. The unit 49 includes a piston 50 connected with the two separator diaphragms 51 and 52, as shown, the latter diaphragm being exposed to ambient sea pressure through the opening 53 exactly as shown in FIG. 2. The opposing diaphragm 51 is exposed to the pressure of the oil filling the casing 47 through the opening 54. The rod 55 of piston 50 is pivotally connected at 56 within the casing 47 to a compensating lever arm 57 having one end pivoted at 58 to the unit casing. A relatively small loading cylinder 59 mounted suitably within the casing 47 has a piston 60 and rod 61 connected at 62 to the compensating lever arm 57. The piston 60 is connected with a flexible separator diaphragm 63 having its skirt portion clamped to the wall of cylinder 59 and the lower side of this diaphragm is subjected directly through a pipe 64 to gas pressure from a high pressure gas bottle 65 which may in practice be located either inside or outside of the unit casing 47. The opposing side of the diaphragm 63 and piston 60 is in communication through another pipe 66 with gas pressure from a lower pressure gas bottle 67. The diaphragm 63 completely separates the pressurized gases from the two bottles and sufficient pressure will exist in the cylinder 59 on both sides of the diaphragm 63 to exclude oil in the unit casing 47. The pressure differential acting on the piston 60 and diaphragm 63 from the bottom due to the higher gas pressure in the bottle 65 will always load the arm 57 sufficiently to maintain in the unit casing 47 a positive pressure or a pressure somewhat above ambient sea pressure. Thus, the gas loading means in FIG. 3 serves the same purpose as the spring 39 in the prior embodiment. In FIG. 3, additional control may be provided by regulating the gas pressure from the bottle 67 and thus using this secondary pressure source as a control.

FIG. 4 is a diagrammatic representation of a further modification where the difference in specific gravity of ambient sea water and the internal oil of the power unit is utilized to compensate and maintain the desired positive pressure differential in the power unit. In FIG. 4, the unit casing is indicated by the numeral 68 and again the internal power components have been omitted for simplicity but may be the same as depicted in FIG. 1. At its lower end, the casing 68 has an outlet pipe section 69 connecting directly to a rather wide shallow rigid container 70 which also serves to support the device on the ocean bottom. Suitable braces 71 are provided, as shown. Ambient sea water enters and fills the container 70 preferably through a filter 72 mounted thereon.

A flexible separator diaphragm or bladder 73 is disposed bodily inside of the container 70 as shown with a nipple 74 thereof firmly engaged and sealed within pipe section 69 to provide completely separated chambers 75 and 76, the former being filled with the oil which also fills the casing 68 and the latter being filled with sea water. The sea water or other ambient liquid in which the invention unit is immersed has a greater specific gravity than the oil filling the casing 68 and chamber 75 and consequently because of this specific gravity differential there will always be maintained a positive pressure head inside of the invention unit, exactly as in the prior embodiments so that sea water will be positively excluded. Control of the positive pressure is accomplished by altering the specific gravity of the internal liquid, such as oil. The system in FIG. 4 has the advantage of being completely free of mechanical components and requires only a rigid wall structure for the elements 68, 69 and 70 and a flexible material for the diaphragm or separator 73.

FIG. 5 shows still another embodiment of the invention based on the principle of differential areas of two compensating pistons. In this figure, the main unit casing is shown at 77 schematically having a depending housing 78 thereon for the previously described double diaphragm compensating and separator device 79, also shown somewhat schematically in FIG. 5. An internal cylinder extension 80 of predetermined reduced diameter projects into the unit casing 77 and the cylinders and casing are suitably unitized. The unit 79 includes a relatively large area compensating piston 81 connected in the described manner to the two separator diaphragms 82 and 83, the latter being exposed to ambient sea pressure through the opening means 84.

Within the reduced diameter cylinder extension 80 is a reduced area piston 85 rigidly interconnected by a rod 86 with the larger piston 81. The piston 85 is similarly connected with a flexible separator diaphragm 87 having a skirt secured as at 88 to the cylinder wall. The top of diaphragm 87 and piston 85 are exposed to the pressure of oil or like liquid which fills the unit casing 77. An atmosphere chamber 89 unfilled with any liquid exists between the two pistons and between the diaphragms 87 and 82.

As in the prior forms of the invention, ambient sea pressure acts upon the larger piston 81 while the pressure of the fluid filling the casing 77 acts upon the smaller piston 85. The area differential between the two pistons which is predetermined and may be varied establishes within the unit casing 77 a positive pressure at all times and at all depths which assures the exclusion of sea water.

It should now be evident that the invention in all forms provides a deep submersible power unit of wide utility having built-in automatic pressure compensating separator means of simplified form which maintains in the oil filled casing of the power unit a pressure in excess of ambient sea pressure at all depths. The invention is characterized by simplicity and economy of construction and reliability. Its virtues in comparison to the prior art should now be clear to anyone skilled in the art without further description.

In the form of the invention shown in FIG. 3, an additional separator diaphragm may be employed where the rod 61 passes through the hub of loading cylinder 59. Such diaphragm, if employed, will be similar to the diaphragm 87 in FIG. 5, the diaphragm being clamped between two sections of the rod 61.

What is claimed is:

1. A deep submersible power unit for use at great depths under water comprising a unit casing, power components within the unit casing and being enclosed therein and said unit casing being filled with a substantially noncompressible fluid, and a compensating and separating device connected with the unit casing and including a flexible diaphragm element which is exposed to ambient sea pressure and opposed by the pressure of the fluid in the unit casing, and means loading the compensating and separating device so that the same will pressurize said fluid in the unit casing to a pressure in excess of ambient sea pressure.

2. The structure of claim 1, wherein the loading means is a spring connected with said device and said spring disposed entirely inside of the unit casing and within the fluid filling said casing and thereby isolated from ambient sea water.

3. The structure of claim 2, and said device comprising a cylinder unit on said casing, a piston within the cylinder unit, said spring urging said piston in one direction, and at least one flexible separator diaphragm interconnecting said piston and the cylinder of said unit to completely separate ambient sea water from the interior of said casing.

4. The structure of claim 3, and a pair of independently formed separator diaphragms secured to said piston in opposing relation and being secured to the cylinder within which the piston operates near opposite ends of the cylinder, one of said diaphragms exposed to ambient sea water and the other diaphragm exposed to the fluid which fills said unit casing.

5. The structure of claim 1, wherein said loading means comprises an additional pressurized fluid means including a movable operator and said operator connected with and exerting a predetermined loading force on the compensating and separating device.

6. The structure of claim 5, wherein said pressurized fluid means is a container of pressurized gas, and a cylinder-piston actuator in communication with the gas in said container and having a connection with said movable operator.

7. The structure of claim 6, and wherein said movable operator is a pivoted arm having a first connection with said device and a second connection with the piston of said cylinder-piston actuator.

8. The structure of claim 7, and a second relatively low pressure container of gas communicating with said cylinder-piston actuator in opposing relation to the first-named container of pressurized gas.

9. The structure of claim 1, wherein said loading means is comprised of a pair of interconnected pistons forming parts of the compensating and separating device and said pistons being of distinctly different diameters to thereby create a positive pressure differential within the unit casing responsive to the pressure of ambient sea water on the larger piston.

10. The structure of claim 1, and said loading means comprising a first chamber exposed to ambient sea pressure on one side of said diaphragm and said fluid filling the unit casing being on the other side of said diaphragm and having a specific gravity less than the specific gravity of the ambient sea water.

11. The structure of claim 10, and said first chamber being formed by a substantially rigid container having an opening to admit ambient sea water and said diaphragm disposed bodily within said rigid container and defining another chamber for said fluid of lesser specific gravity.

References Cited

UNITED STATES PATENTS

| 2,744,485 | 5/1956 | Karig | 114—16X |
| 3,062,002 | 11/1962 | Shaffer | 114—16X |
| 3,440,825 | 4/1969 | Lloyd | 114—16X |

J. KARL BELL, Primary Examiner

U.S. Cl. X.R.

114—16